Sept. 28, 1948.　　　　K. A. KAIL　　　　2,450,240
RADIO DIRECTION FINDING MEANS
FOR AVIATION TRAINERS
Original Filed July 30, 1943　　　　2 Sheets-Sheet 1

KARL A. KAIL
*INVENTOR.*

BY
ATTORNEYS

Sept. 28, 1948.    K. A. KAIL    2,450,240
RADIO DIRECTION FINDING MEANS
FOR AVIATION TRAINERS
Original Filed July 30, 1943    2 Sheets-Sheet 2

KARL A. KAIL
*INVENTOR.*

BY
ATTORNEYS

Patented Sept. 28, 1948

2,450,240

UNITED STATES PATENT OFFICE 2,450,240

RADIO DIRECTION FINDING MEANS FOR AVIATION TRAINERS

Karl A. Kail, Montrose, Pa., assignor to Link Aviation, Inc., Binghamton, N. Y., a corporation of New York Original application July 30, 1943, Serial No. 496,738. Divided and this application June 19, 1944, Serial No. 540,977

2 Claims. (Cl. 35—10)

My invention relates to trainers for aviators and comprises means for improving in a grounded aviation trainer means for simulating the functioning of certain of the instruments in such a trainer.

This application is a division of my application Serial Number 496,738, filed July 30, 1943, for Magnetic compass indicating system for aviation trainer, since matured into Patent No. 2,445,673, dated July 20, 1948.

It is the principal object of my invention to provide an improved radio direction finding system for use in a grounded aviation trainer.

The detailed objects of my invention will be understood by the following description and appended claims. In order that the description may be more readily understood reference is made to the accompanying figures wherein Fig. 1 shows a general view of the trainer and instrument system which my present invention comprises.

Figure 2:
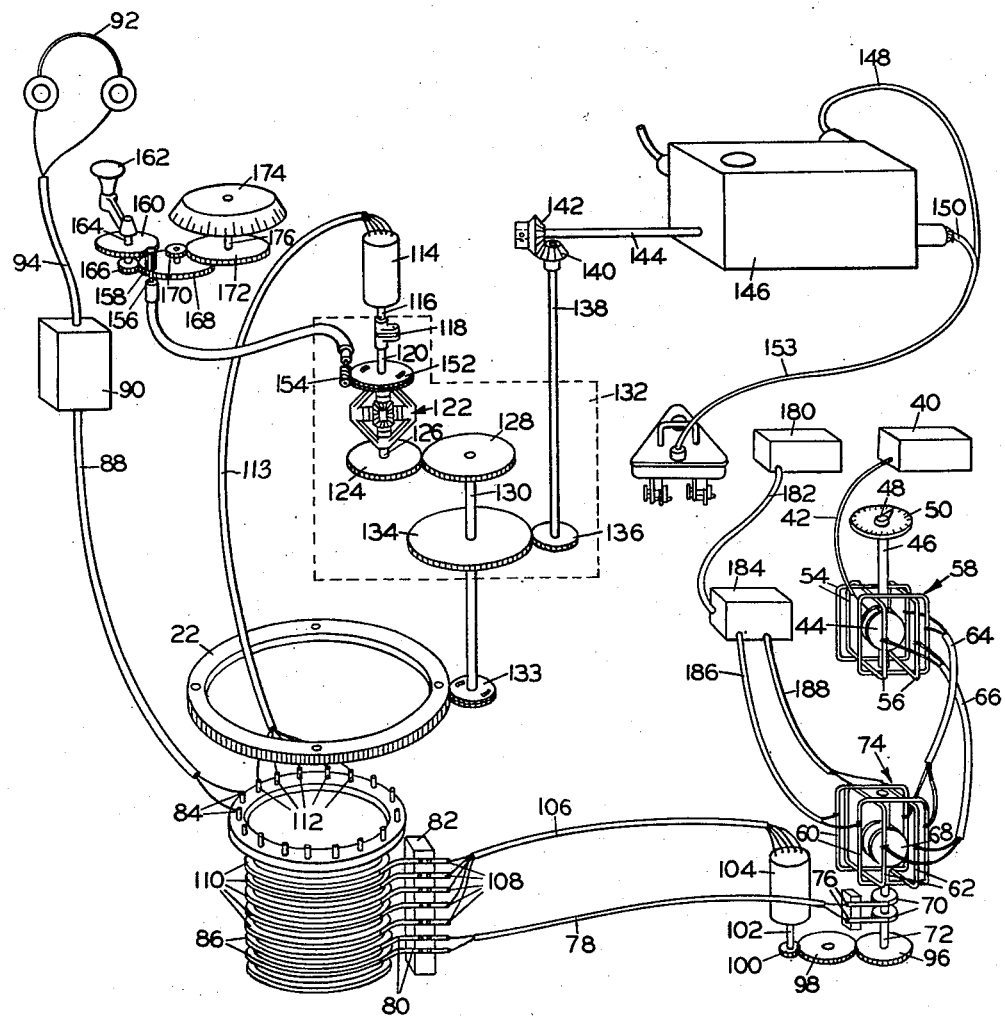

Fig. 2 is a diagrammatic view of the instrument system of this invention.

Figure 1:
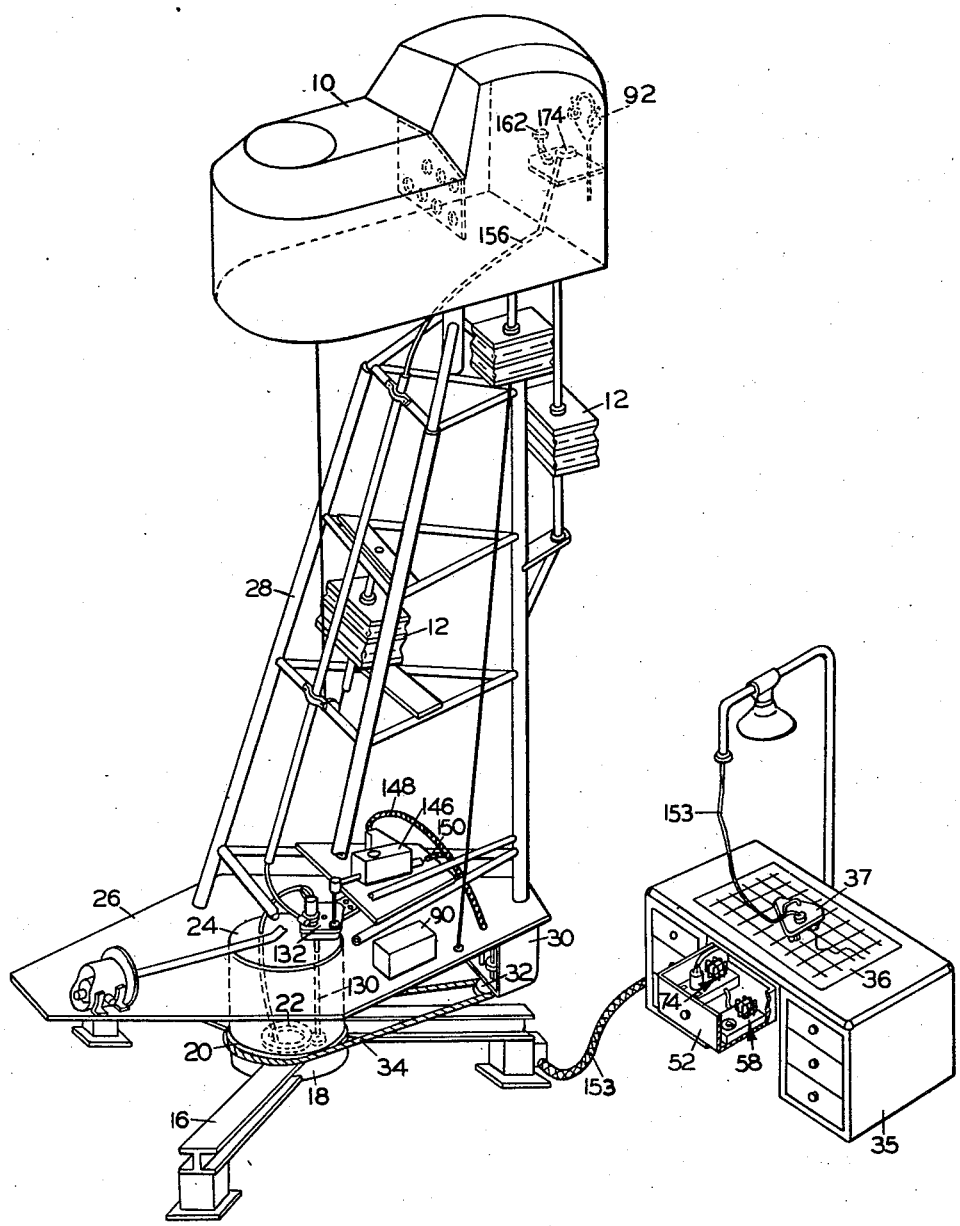

Reference is now made to Fig. 1 which shows a trainer of the type disclosed in U. S. Patents 1,825,462 and 2,099,857. These trainers, which are of the type manufactured by Link Aviation Devices, Inc., of Binghamton, New York, comprise a fuselage 10 which is mounted upon a universal joint (not shown) positioned near the central part of the floor of the fuselage. A pair of bellows 12 known as the elevator bellows are provided and through a system of vacuum, valves and linkages these bellows may be made to pitch fuselage 10 in simulation of the climbing and diving of a plane in actual flight. A second pair of bellows, known as the aileron bellows, are used to bank the fuselage 10 laterally in simulation of the banking of a plane in actual flight. Only one of these aileron bellows is shown and it is designated 14. Still referring to Fig. 1, it will be seen that a triangular base 16 is provided, and rigidly attached thereto is a lower bearing housing 18. Formed integrally with the upper end of this bearing housing is an exterior annular groove 20. Inside lower bearing housing 18 and rigidly affixed thereto is ring gear 22. Base 16, lower housing 18, annular groove 20 and ring gear 22 are fixed in relation to the floor upon which base 16 rests. Upper bearing housing 24 is rotatably mounted with respect to lower housing 18 by means of a suitable bearing arrangement and rigidly attached to housing 24 is platform 26 upon which rests the triangular tower 28 which holds the fuselage 10 and other associated apparatus. Rigidly affixed to and depending from platform 26 is turning motor 30 which has an output shaft upon which is rigidly affixed a wheel 32 which also is grooved. Turning belt 34, it will be noticed, wraps around groove 20 integral with fixed lower bearing housing 18 as well as around the output wheel 32 of turning motor 30. Whenever the student in the trainer presses one of the rudder pedals (not shown) therein, turning motor 30 is actuated and the output wheel 32 rotates in a direction dependent upon which rudder pedal is pressed. The friction between groove 20 and belt 34 on the one hand, and wheel 32 and belt 34 on the other, is sufficiently great to prevent slipping therebetween, and consequently, wheel 32 travels along belt 34 causing motor 30, platform 26, tower 28, fuselage 10 and upper bearing housing 24 to rotate in simulation of the turning of a plane in actual flight.

Also seen in Fig. 1 is an operator's desk 35 which has placed thereupon a map 36 over which recorder 37 travels. A detailed description of recorder 37 may be found in U. S. Patent 2,179,663, and as there disclosed it moves forward over the map or chart 36 to simulate the forward travel of the trainer, and whenever the trainer fuselage 10 is turned the recorder 37 turns its direction of travel on the map. The recorder also has an inking wheel (not shown) which makes a line along the map as the recorder travels over it. By a reference to the position of the inking wheel upon the map 36 the operator may determine the exact simulated location of the trainer.

All of the foregoing apparatus forms no part of my instant invention except when combined with features to be later described, and therefore, a more detailed description is omitted, but for a thorough explanation thereof reference is made to the above-mentioned United States patents.

Radio compasses and radio direction finders are commonly used in present-day aircraft to determine the direction of a radio station with respect to the longitudinal axis of the plane in a manner somewhat similar to the way magnetic compasses are used to determine the direction of the magnetic pole with respect to the longitudinal axis of the plane. There are various types of radio compasses but all types utilize as a fundamental principle the fact that a loop antenna is highly directional and when the loop is in the plane of the waves of the radio transmitting station a maximum voltage is induced in the loop but when the plane of the loop is perpendicular to the path of the waves a minimum voltage is induced therein. Different designs of radio compasses indicate this maximum or minimum by different methods, the two most common being by means of a left-right visual indicator or by a "null" (no signal in earphones). In actual flight the bearing of the radio station with respect to the longitudinal axis of the plane is accomplished by rotation of the loop antenna until the indicating instrument (visual or aural) gives the desired indication (pointer centered or no signal heard in the earphones), whereupon the bearing is shown by the visual indicator, or in the case of the aural system, by a pointer and azimuth scale, one of which is mechanically connected with the loop antenna and rotates therewith, the other having a fixed position.

The following improved means are provided by my present invention in order that the practice of taking bearings by means of radio in a plane in actual flight may be more exactly simulated in a grounded aviation trainer.

Reference is made to Fig. 2 which shows a unit 40 which generates a source of radio frequency carrier waves modulated by any desired audio frequency source. Transmitter 40 is preferably of the type disclosed in the copending application of Gregor L. Lang, Serial Number 440,950, filed April 29, 1942, since matured into Patent No. 2,435,502, and is preferably located in the desk 35. By means of lead 42 the modulated radio frequency waves are carried to transmitting antenna 44 which takes the form of a rotatable coil of wire. This rotor coil 44 is affixed to a rotatable vertical shaft 46 which has attached to its upper end a movable index knob and pointer 48 which moves across the face of a scale 50 graduated from zero to 360°, scale 50 being fixedly mounted upon a part of the housing of the unit. The unit is in drawer 52 of desk 35. Rotor coil 44 is positioned within a pair of perpendicularly disposed coils 54 and 56. Rotor coil 44 and coils 54 and 56 form what is commonly referred to as a goniometer, and they are designated by 58 in Figs. 1 and 2. A second pair of perpendicularly disposed coils 60 and 62 are connected in series to coils 54 and 56, respectively, by means of wires contained in cables 64 and 66, respectively. A later detailed description of these coils will be given. A second rotor coil 68 is mounted within the last pair of perpendicularly disposed coils 60 and 62 and one end of the wire thereon is connected to each of the slip rings 70 which are affixed to the vertical shaft 72 upon which rotatable coil 68 is mounted. Coils 60, 62 and 68 form a second goniometer designated generally by 74 in Figs. 1 and 2. A pair of brushes 76 engage slip rings 70 and by means of wires in cable 78 are connected to two of the brushes designated generally by 80 which are carried by brush block 82. Each of the brushes 80 is connected to one of the pins 84 by means of one of the slip rings 86, and it will be seen that cable 88 contains two wires each of which connects with one of the pins 84. These two wires carry the current from slip rings 70 into radio receiver 90. A pair of earphones 92 is connected to the radio receiver by means of cable 94. This radio receiver is of the type customarily used in today's aircraft having the usual tuning means operable over the band of frequencies employed in aircraft navigation, as well as volume control means. Radio transmitter 40 likewise is capable of generating radio frequencies over this same range.

Referring still to Fig. 2, gear 96 is rigidly affixed upon the lower end of shaft 72 and a second gear 98 meshes with gear 96 and with pinion 100 which is mounted upon the lower end of the output shaft 102 of a Selsyn-type receiver 104. This receiver is connected by means of wires contained in cable 106 to a plurality of the brushes 108, each of the wires being connected to one of the brushes. Each of these brushes in turn contacts one of the slip rings 110 and each of these slip rings is connected to one of the pins 112 at the top of the assembly. Cable 113 contains a plurality of wires each of which connects with one of the pins 112 at one end and with the Selsyn-type transmitter 114 at the other end. The input shaft 116 of this transmitter is rigidly affixed by means of coupling 118 to the upper end of shaft 120 which is the output shaft of differential designated generally by 122. The primary input of this differential is by means of gear 124 and the shaft 126 upon which it is rigidly affixed. Gear 124, it will be seen, meshes with gear 128 which is rigidly affixed upon the upper end of vertical shaft 130 upon the lower end of which is fixedly mounted antibacklash gears 133 which mesh with ring gear 22. It will be recalled that ring gear 22 is fixedly mounted in lower bearing housing 18.

In Fig. 1, it will be seen that vertical shaft 130 enters a boxlike structure 132 which is referred to in the art as the heading gear box. The mechanism contained in this gear box is enclosed in dotted lines in Fig. 2. It will be seen that inside the heading gear box 132 and fixed upon vertical shaft 130 is another gear 134 which meshes with a smaller gear 136. This last-mentioned gear is fixed upon a second vertical shaft 138 which has rigidly mounted upon its upper end bevel gear 140 which meshes with a second bevel gear 142 affixed to a horizontal shaft 144. The right end of this last-mentioned shaft enters another boxlike structure 146 which represents the wind drift instrument which is described in detail in the copending application of Gunne Lowkrantz and myself, Serial No. 406,056, filed August 8, 1941. It is to be noted that the recorder 37 is connected to the wind drift instrument 146 by means of electrical connections 148 and 150 which are carried by a single cable 153. The wind drift instrument as explained in the mentioned copending application provides means for making the speed of the recorder 37 responsive to the changes in the assumed ground speed of the trainer.

The secondary input of differential 122 is in the form of antibacklash gear 152 driven by worm 154 which is connected by means of flexible cable 156 to pinion 158 engaging gear 160 which is driven by crank 162. Crank 162 is mounted upon shaft 164 upon which gear 169 is rigidly affixed and upon the lower end of shaft 164 is pinion 166 which meshes with gear 168. A stub shaft centered upon gear 168 has mounted upon its upper end pinion 170 which drives gear 172 and which in turn rotates azimuth scale 174 by means of shaft 176. Azimuth scale 174 is graduated from zero to 360, and a suitable reference mark (not shown) is fixed upon the inside of fuselage 10 in order that the position of azimuth scale 174 may be readily determined.

The functioning of my radio system is as follows: The output of the source 40 of modulated radio frequency carrier waves is fed to rotatable transmitting antenna 44. The radiations of transmitting antenna 44 induce a current in each of the pair of perpendicularly disposed coils 54 and 56 which surround coil 44. The coils 54 are in reality a single coil because they are formed of a continuous piece of wire, this single coil being split into two sections to allow the positioning of vertical shaft 46. By means of the two wires in cable 64 the current flowing in coil 54 as a result of the voltage induced therein is carried to coil 60 which is also a single coil divided into two sections. Therefore the two coil sections 54 are connected in series with the two coil sections 60 and the same current induced in coil 54 flows in coil 60.

Sections 56 likewise are a single coil as are sections 62, and the first two mentioned sections are in series with the last two by virtue of the wires in cable 66. Therefore, the same current flows in both of these coils.

The currents flowing in sections 60 and 62 set up a field having a pattern dependent upon the currents induced therein. The current induced in sections 54 depends upon the position of rotatable transmitting coil 44 relative to sections 54, and therefore, the current induced in sections 60 depends upon the position of coil 44. The pattern set up about sections 62, it will be understood, in turn depends upon the position of coil 44. At the same time, the current induced in sections 56 and 62 and the field pattern set up by section 62 will also depend upon the position of coil 44. The field pattern set up by sections 60 and 62 therefore depends upon the position of coil 44, and the current induced in rotatable coil 68 by the fields of sections 60 and 62 depends upon the position of coil 68 relative to these last mentioned sections. When coil 68, which acts as the directional receiving antenna, bears the same relationship to its surrounding sections 60 and 62 that coil 44 bears to sections 54 and 56, the maximum current is induced in the receiving antenna 68 and therefore the maximum signal is heard in earphones 92. If coil 68 is moved 90 degrees from this position of maximum interception, no current is induced in this coil, and therefore, no signal is heard in the earphones 92. This no signal position simulates the position of the receiving loop in a real plane relative to the path of the waves from a real transmitting station when no signal is picked up, which position, as stated previously, is referred to as the "null" position. If coil 68 is moved 90 degrees further, a second maximum signal position is realized, while at a further 90 degree position is another "null" position.

The current induced in coil 68 is led to slip rings 70, is picked up by brushes 76, carried by the wires in cable 78 to brushes 80, slip rings 86, pins 84, and by the wires in cable 88 to radio receiver 90. Receiver 90 amplifies, detects and further amplifies the audio components of the signal generated by transmitter 40 so that these signals may be heard by earphones 92. For any signal to be received by earphones 92 receiver 90 must be tuned to the same carrier frequency generated by transmitter 40.

Also seen in Fig. 2, whenever the trainer rotates, shaft 130 is rotated by gears 133 meshing with ring gear 22. Gear 128 is rotated, rotating gear 126 which is the primary input of differential 122. The output shaft 120 is rotated as is the input shaft 116 of Selsyn-type transmitter 114. The rotation of the input shaft 116 of this transmitter in either direction produces, by means of the wires in cable 113, pins 112, slips rings 110, brushes 108 and the wires within cable 106 a rotation of the output shaft 102 of the Selsyn-type receiver 104 through the same angle and in the desired direction. This system of remote actuation is well known in the art. Pinion 100 is therefore turned as is gear 98, gear 96, shaft 72, slip rings 70 and the rotatable directional receiving antenna coil 68.

It will be seen, therefore, that a rotation of the trainer fuselage 10 automatically rotates directional receiving antenna coil 68. The immediately aforedescribed system comprises such ratios that antenna 68 is rotated through the same angle as the trainer is turned. (It should be noticed that in the absence of this system no rotation of the coil 68 would occur as a result of the rotation of the trainer because this coil is positioned in one of the drawers of the desk 35.)

A reference to Fig. 2 also discloses that a rotation of loop control crank 162 rotates gear 160 and pinion 158, which, by means of flexible shafting 156 rotates worm 154, the secondary drive 152 of differential 122, the output shaft 120 of this differential, and the input shaft 116 of Selsyn-type transmitter 114 resulting in a rotation of the output shaft 102 of the Selsyn-type receiver 104 through the same angle as input shaft 116 of transmitter 114 is rotated. Simulated directional receiving antenna 68 is rotated by this rotation of output shaft 102.

From the foregoing, it will be realized that there are two movements which will cause a rotation of simulated directional receiving antenna 68, viz., a rotation of the trainer fuselage and a rotation of loop control crank 162.

The immediately aforedescribed system is synchronized with the trainer as follows: Transmitter 40 is set to generate a radio frequency carrier wave of any desired frequency and this wave is modulated by any suitable audio frequency source, as explained in the copending application Serial Number 440,950. Radio receiver 90 is tuned to the same frequency as the carrier generated by source 40 and the volume control of the receiver is set to give a low level signal. Azimuth control knob 48 which indicates the direction of the assumed geographical position of the trainer from the assumed geographical position of the radio station simulated by transmitter 40 is set so that it points to the zero on azimuth scale 50. The trainer is placed on an assumed east heading, and crank 161 is rotated, thereby rotating receiving antenna 68, until a null or no signal is heard in earphones 92. Inasmuch as azimuth control knob 48 and its associated scale 50 indicate the assumed direction of the trainer from the assumed position of the radio station being simulated, it is clear that when this knob is set at zero, as has been done, the trainer is assumed to be due north of the station. Furthermore, inasmuch as it is assumed that the trainer is flying due east at a point directly north of the station, the relative bearing of the station with respect to the longitudinal axis of the trainer must be 90°. Consequently, pinion 158 is disconnected from flexible shafting 156 and crank 162 is rotated until azimuth scale 174 indicates a reading of 90°. The flexible shafting 156 is then reconnected with pinion 158. Then, directional receiving antenna 68 is loosened so that it may turn upon shaft 72, and antenna 68 is turned until no signal or a "null" is heard in earphones 92. The receiving antenna is then affixed upon shaft 72 to turn therewith. The positions of directional receiving antenna 68, heading of the trainer 10, position of azimuth scale 174 and position of transmitter azimuth control knob 48 are then properly synchronized.

It is clear that if thereafter the trainer is rotated through a given number of degrees, e. g., twenty-five, by means of ring gear 22, gear 133, shaft 130, gear 128, gear 124, differential 122 and shaft 120 the input shaft 116 of transmitter 114 is rotated through a certain angle, its direction depending upon the direction of rotation of the trainer, the output shaft 102 of receiver 104 is rotated through the same angle as the input shaft 116 of transmitter 114 and directional receiving antenna 68 is rotated through an angle equal to the angle of rotation of the trainer. The "null" which was received when the mechanism was synchronized as above will no longer be received by the navigator in the trainer and, therefore, he must rotate crank 162 to bring rotatable directional receiving coil 68 back to the "null" position. The new bearing to the assumed radio transmitting station with respect to the longitudinal axis of the aircraft will be indicated by azimuth scale 174.

It is clear, therefore, that a "null" once having been received, a rotation of the trainer will cause a disappearance of the null by rotating directional receiving antenna 68 just as in the case of a plane in actual flight where the "null" having once been obtained disappears by a turning of the plane. Furthermore, the student must by means of crank 162 change the position of directional antenna 68 to receive the "null," and the new bearing to the station may be determined by a reference to azimuth scale 174. This practice exactly simulates the steps that the radio man in a real plane must perform to secure the bearing of a radio station by the "null" method.

Having synchronized the apparatus with the trainer on a due east heading at a point directly north of the transmitting station, let us assume that instead of the trainer changing its heading it proceeds eastward. It is clear that if a plane due north of a transmitting station and flying due east had its loop in the "null" position, eastward travel would cause a disappearance of the null because the loop would no longer be in a plane parallel to the path of the radiated waves. Consequently, with my aforedescribed apparatus, as the instructor views the travel of the recorder 37 eastwardly over map 36, the assumed direction of the trainer from the radio station no longer will be due north but will be east of north. The instructor therefore rotates azimuth knob 48 so that it indicates on scale 50 the assumed direction of the trainer from the assumed position of the transmitting station, as determined by the position of the recorder 37 upon map 36 relative to the assumed location of the radio station as shown upon the map. This rotation will rotate transmitting antenna 44 and the voltages induced in coil sections 54 and 56 and in sections 60 and 62 will be varied. Consequently, the field set up by sections 60 and 62 will be of a different pattern and directional receiving antenna 68 will no longer be positioned with respect to this different field pattern to intercept no signal. Therefore, the student in the trainer must rotate loop control crank 162 to bring rotatable coil 68 into a position where no signal is picked up by receiving antenna 68. The rotation of crank 162 simultaneously rotates azimuth scale 174 and when no signal is heard in earphones 92 receiving antenna 68 has been rotated through the same angle as transmitting antenna 44. The new bearing of the radio station with respect to the longitudinal axis of the trainer may be determined by the student by a reference to scale 174.

It has been stated that when directional receiving antenna 68 bears the same relationship to its surrounding coil sections that transmitting antenna 44 bears to its surrounding coil sections, maximum current is induced in the receiving antenna 68 and, therefore, the maximum signal is heard in earphones 92. But if antenna 68 is moved 90° from this position of maximum signal interception no current is induced in this antenna and, therefore, no signal is heard in the earphones 92. It is clear, therefore, that for each position of transmitting antenna 44 there are two positions of receiving antenna 68 which will give no signal or a "null" in the earphones 92. These positions are 180° apart, and therefore, for each position of antenna 44 the student in the trainer will get a "null" position when azimuth scale 174 is in a certain position and when it is 180° from that position. The student in the trainer will ordinarily be able to tell which of the two positions 180° apart of azimuth scale 174 indicates the correct assumed direction of the radio station with respect to the assumed direction of the longitudinal axis of the trainer because the general assumed position of the trainer relative to the radio station should be known to him. This elimination of the reciprocal of the true bearing of the assumed radio station to the trainer simulates the same practice which the navigator of a real plane must follow because the loop antenna of a real plane likewise has for any given station at any given place two "null" positions.

From the foregoing, it will be readily understood that my invention provides improved means for simulating the taking of radio bearings in a grounded aviation trainer. These means comprise in general means whereby the instructor may set up a field pattern depending upon the assumed direction of the trainer from the radio station, means whereby a rotation of the trainer automatically affects the strength of the signals intercepted by the directional antenna, and additional means which the student may use to bring a simulated directional receiving antenna into the "null" position.

Also seen in Fig. 2 is a unit 180 connected by means of cable 182 to a unit 184 which is connected by means of wires in cables 186 and 188 to the perpendicularly disposed goniometer 74, in the same manner that the perpendicularly disposed coil sections 54 and 56 are connected to sections 60 and 62. Unit 180 is similar in all respects to transmitter 40 and unit 184 contains a pair of perpendicularly disposed coil sections, a rotatable coil and azimuth indicating means identical with perpendicularly disposed coil sections 54 and 56, rotatable coil 44 and azimuth indicating means 48 and 50. The provision of these duplicate means make it possible to simulate two transmitting systems. The perpendicularly disposed coil sections 60 and 62 have the frequencies generated by both of the transmitting stations 40 and 180 flowing therein but no interference between the two transmitting stations occurs because the carrier frequencies used in actual practice are sufficiently different. The student in the trainer will, of course, hear the audio signals generated by only one of the transmitting stations because he can intercept signals only when his receiver 90 is tuned to the frequency of the transmitting station 40 or 180. The provision of duplicate transmitting systems makes it possible, by means of my invention, to simulate the common practice of determining a radio "fix" which is accomplished by determining the relative bearings from the longitudinal axis of the plane of two radio stations, the location of the plane being at the intersection of the bearings.

Inasmuch as the second transmitting system is identical with the first completely described system, it is deemed unnecessary to give a detailed description of its construction, synchronization and functioning. Directional receiving antenna 68 functions in relation to unit 184 exactly as described in relation to goniometer 58.

The foregoing being but a preferred embodiment of my invention numerous details may be made in the construction thereof without departing from the substance of the invention.

I claim:

1. In a grounded navigation training system of the type including a fuselage rotatably mounted upon a stationary base and a flight simulating device remotely situated from and controlled by said fuselage and arranged to travel over a chart to indicate the assumed geographical position of the fuselage, means for simulating the operation of radio direction finding equipment carried by planes in actual flight, said means comprising, in combination, a signal source connected to a directional transmitting antenna unit, said directional transmitting antenna unit having a part movable to establish a directional field variable in accordance with the assumed bearing of said fuselage from a radio station as determined by the location of said flight simulating device upon said chart, a directional receiving antenna disposed in the field established by said transmitting antenna unit, signal receiving means in said fuselage connected to said directional receiving antenna, a Selsyn-type receiver located adjacent said directional receiving antenna and mechanically connected thereto for moving the same, a Selsyn-type transmitter electrically connected to said Selsyn-type receiver, means operated by the rotation of said fuselage relative to said stationary base connected to said Selsyn-type transmitter for actuating the same, means within said fuselage selectively operable by an operator and differentially combined with said means operated by the rotation of said fuselage for operating said Selsyn-type transmitter, and index means within said fuselage operable in response to an operation of said selectively operable means within said fuselage.

2. In a grounded navigation training system of the type including a fuselage rotatably mounted upon a stationary base and a flight simulating device remotely situated from and controlled by said fuselage and arranged to travel over a chart to indicate the assumed geographical position of the fuselage, means for simulating the operation of radio direction finding equipment carried by planes in actual flight, said means comprising, in combination, a signal source located outside said fuselage connected to a directional transmitting antenna unit located outside said fuselage, said directional transmitting antenna unit having a part movable to establish a directional field variable in accordance with the assumed bearing of said fuselage from a radio station as determined by the location of said flight simulating device upon said chart, a directional receiving antenna disposed in the field established by said transmitting antenna unit, signal receiving means in said fuselage connected to said directional receiving antenna, a Selsyn-type receiver located adjacent said directional receiving antenna and mechanically connected thereto for moving the same, a Selsyn-type transmitter located near said fuselage and electrically connected to said Selsyn-type receiver, means operated by the rotation of said fuselage relative to said stationary base and connected to said Selsyn-type transmitter for actuating the same, means within said fuselage selectively operable by an operator and differentially combined with said means operated by the rotation of said fuselage for operating said Selsyn-type transmitter, and index means within said fuselage operable in response to an operation of said selectively operable means within said fuselage.

KARL A. KAIL.

REFERENCES CITED

The following references are of record in the file of this patent:

UNITED STATES PATENTS

| Number | Name | Date |
| --- | --- | --- |
| 1,825,462 | Link | Sept. 29, 1931 |
| 2,099,857 | Link | Nov. 23, 1937 |
| 2,164,412 | Koster | July 4, 1939 |
| 2,312,962 | De Florez | Mar. 2, 1943 |
| 2,321,799 | Cone | June 15, 1943 |
| 2,326,764 | Crane | Aug. 17, 1943 |
| 2,326,766 | Delareuelle | Aug. 17, 1943 |
| 2,332,523 | Norden | Oct. 26, 1943 |
| 2,346,693 | Lyman | Apr. 18, 1944 |